Jan. 14, 1964    C. WEGNER    3,117,569
INDICATOR INSTRUMENT
Filed May 21, 1959
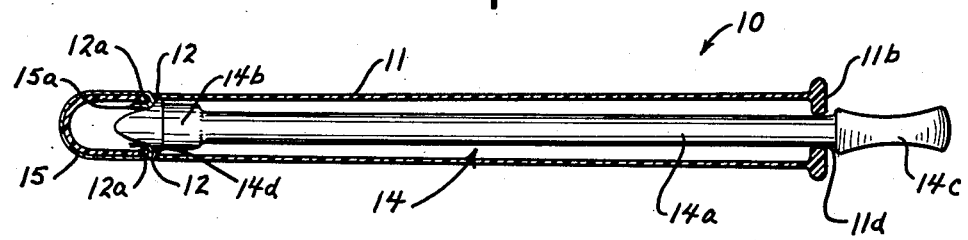
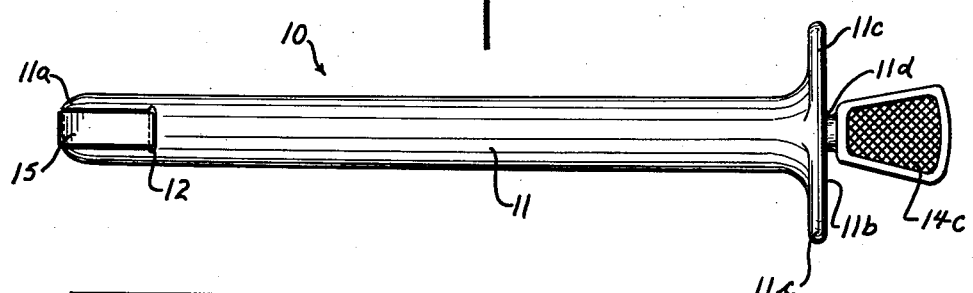
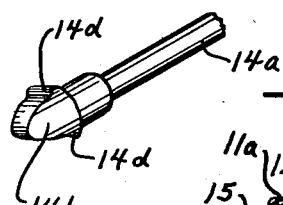
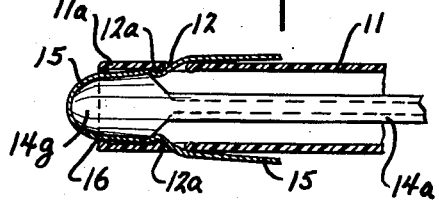
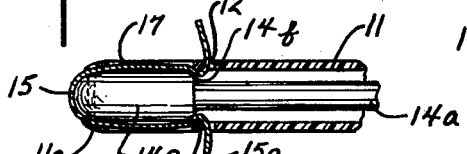
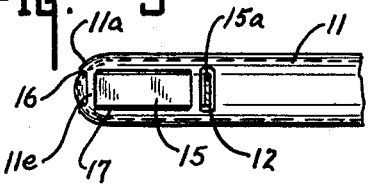
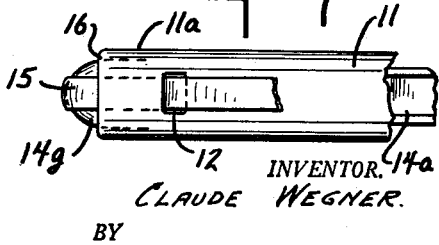
INVENTOR.
CLAUDE WEGNER.
BY
Warren D. Flackbert.
ATTORNEY.

United States Patent Office 3,117,569
Patented Jan. 14, 1964

3,117,569
INDICATOR INSTRUMENT
Claude Wegner, Clinton, Ind., assignor to Aurthur H. Griep and Alice K. Griep, both of Evansville, Ind.
Filed May 21, 1959, Ser. No. 814,717
5 Claims. (Cl. 128—2)

The present invention broadly relates to an indicator instrument and more particularly to a new and novel structure for mounting an indicator tape used for determining the fertility period of a female.

With the advent of the use of diabetic testing tape, commonly marketed as "Testape," for determining the presence of sugars incident to the release of an ovum during a woman's fertile period, it has become desirable to have a device on which such "Testape" may be readily mounted for simple and effective use.

Accordingly, by virtue of the instant invention, the applicant has provided a novel structure for the aforementioned use which, in one embodiment, includes a generally elongated hollow body member having openings near a closed end thereof for receiving the ends of the diabetic testing ribbon or tape, with a movable plunger or piston being provided therein for maintaining the tape in firm engagement between an enlarged end portion on the plunger and the inner surface of the hollow body member. The openings, in the form of laterally disposed slots, are slightly depressed on one side thereof to form raised portions within the hollow body member, which raised portions are adapted to contact shoulders formed on the end of the plunger to effectively lock or wedge the tape material between these shoulders and the raised portions.

In another embodiment of the invention, the elongated hollow body member includes opposed side slots through which the "Testape" is threaded, and openings at the end and between the end and the side slots through which the "Testape" is exposed for use, with the entire assembly being maintained in operative position through the movable plunger disposed within the body member. The plunger serves to wedge the "Testape" between the bullet-like end portion thereof and raised portions adjacent the side slots within the hollow body member.

In still a further embodiment of the invention, a large opening is provided at the end of the elongated hollow body member, with the "Testape" threading through the aforementioned slots of the preceding embodiments of the invention and being maintained in operative position by a movable plunger coacting with nubbins formed adjacent the slots within the hollow body member.

The principal object of the present invention, therefore, is to provide a new and improved structure for mounting an indicator tape used for testing the fertility period of a female.

A further and more general object of the invention is to provide a novel arrangement for positively retaining an indicator tape in position for use on an indicator instrument.

Other objects and a better understanding of the invention will become more apparent from the following description, taken in conjunction with the accompanying drawing, in which:

FIG. 1 is a plan view, partly in section, showing the components forming one embodiment of the instant invention;

FIG. 2 is a view in side elevation of the structure of FIG. 1;

FIG. 3 is a fragmentary perspective view of the movable plunger of FIG. 1;

FIG. 4 is a fragmentary plan view, partly in section, showing the components forming another embodiment of the instant invention;

FIG. 5 is a fragmentary view in side elevation of the structure of FIG. 4;

FIG. 6 is a fragmentary plan view, partly in section, showing the components forming still another embodiment of the instant invention; and, FIG. 7 is a fragmentary view in side elevation of the structure of FIG. 6.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1, 2 and 3, one embodiment of the applicant's novel indicator instrument 10 comprises an elongated hollow body member 11 having ends 11a and 11b, with end 11a being closed and end 11b being formed with ear-like members 11c thereon and having an opening 11d therein. Disposed proximate the closed end 11a of the hollow body member 11 are openings or slots 12 which, in the preferred form of the invention, are laterally disposed to the axis of the hollow body member 11, i.e. are in a plane at right angles therewith.

The openings or slots 12 are typically formed so that the edges 12a thereof fall slightly within the hollow body member 11, i.e. are raised, for reasons which should be more apparent from the discussion herebelow. A plunger member 14 having a shaft-like body 14a and an enlarged end portion 14b is disposed within the hollow body member 11, with a handle 14c therefor extending through the opening 11d in the hollow body member 11. The end portion 14b of the plunger member 14 is formed with shoulders 14d on opposite side edges thereof. When assembled, a tape or ribbon member 15, in this case the aforementioned "Testape," extends over the closed end 11a of the hollow body member 11 and free ends 15a thereof extend into the openings 12 disposed therein (see FIGS. 1 and 2).

In use, the tape or ribbon material 15 is placed over the closed end 11a of the hollow body member 11 and the free ends 15a thereof are inserted into the slots 12 therein, with the plunger 14 being in an extended position during this action. The plunger element 14 is then moved so that the shoulders 14d on the end portion 14b thereof come into contact with the ends 15a of the tape 15 and the raised portions 12a of the slots 12, and wedged, so that the tape 15 is firmly positioned on the outer surface of the closed end 11a of the hollow body member 11 (see FIG. 1). The indicator instrument 10 is then positioned so that the ribbon or tape 15 communicates with the internal female organs, with the reaction of the diabetic testing tape thereto determining fertility.

Referring now to the embodiment of FIGS. 4 and 5, where similar reference numerals indicate like parts to those of FIGS. 1, 2 and 3, the hollow body member 11 has generally opposed slots 12 on opposite sides thereof, which slots have raised portions 12a adjacent thereto on the inner surface of the hollow body member 11. An opening 16 is found on the curved end 11a of the hollow body member 11, with larger openings 17 being disposed between the slots 12 and the end opening 16. Rigidity for the effective use of the instrument is provided by bridge-like areas 11e which separate the end opening 16 and the side openings 17 on the hollow body member 11.

In use, the plunger 14 is moved towards the end 11b of the hollow body member 11 so that a length of tape 15 may be threaded or dropped through one slot 12, the hollow body member 11 and through the opposite slot 12. The plunger 14 is then moved towards the end 11a of the hollow body member 11 so that the tape 15 is tightened around the bullet-like end 14e thereof, and thus exposed for use through the end opening 16 and the side openings 17. The plunger 14 wedges the tape 15 between a portion of the lagging edge 14f thereof and the raised portions 12a adjacent the slots 12 within the hollow body member 11, and, thus, the unit is positively assembled for effective use.

Referring now to the embodiment of FIGS. 6 and 7, where, as with reference to FIGS. 4 and 5, similar reference numerals indicate like parts to those of FIGS. 1, 2 and 3, the hollow body member 11 has generally opposed slots 12 on opposite sides thereof, which slots 12 have nubbins 12a adjacent thereto on the inner surface of the hollow body member 11. A plunger 14 having a shaft 14a and a bullet-like end 14g is movable within the elongated hollow body member 11 to a position where the bullet-like end 14g thereof partially extends through an enlarged opening 16 at the end of the hollow body member 11.

The unit is designed so that when the tape 15 is threaded through the slots 12 when the plunger 14 is at the end 11b of the hollow body member 11, and the plunger 14 is subsequently moved to its position of FIGS. 6 and 7 to tension the tape 15 around the bullet-like end 14g, making the tape exposed and available for use through the enlarged opening 16, the tape 15 is effectively wedged between a portion of the bullet-like end 14g and the nubbins 12a disposed within the hollow body member 11. Thus, this structure is positively maintained in condition for ready use.

From the preceding it should be apparent that the applicant has provided a new and novel basic structure on which a ribbon type fertility testing device may be conveniently and effectively mounted for use. It should be understood that the structure is susceptible to various changes within the spirit of the invention. For example, the characteristic shape of end portion 14b of plunger 14 and the shoulders 14d thereon may be different from that illustrated in FIG. 3 in that a single circumferential shoulder may be provided, or the configuration of the bullet-like ends 14e and 14g of the plungers of FIGS. 4 and 6 may be altered, as long as the tape 15 is mounted in a firm position for use. Moreover, with reference to the embodiments of FIGS. 1 and 6, the raised portion within the hollow body member 11 may be disposed between the slots 12 and the end 11a thereof, i.e. spaced apart from the slots 12, or may be in the form of an internal annular band, for equally effective practice of the invention. Thus, the above description should be considered illustrative and not as limiting the scope of the following claims.

I claim:

1. An article of manufacture comprising, in combination, an elongated tubular body member having a closed end with slots disposed adjacent thereto, a raised portion disposed within said elongated tubular body member between said slots and said closed end thereof, a ribbon member extending between said slots on the outer surface of said elongated tubular body member and having free ends extending into said slots, and a longitudinally movable plunger element having an enlarged end portion disposed within said elongated tubular body member, said enlarged end portion of said longitudinal movable plunger element having a shoulder thereon adapted to secure said free ends of said ribbon member between said shoulder and said raised portion.

2. An article of manufacture comprising, in combination, an elongated tubular body member having a closed end with slots disposed adjacent thereto and an opposite end with ears projecting therefrom and an opening therein, said slots defining raised portions within said elongated tubular body member, a ribbon member extending between said slots on the outer surface of said elongated tubular body member and having free ends extending into said slots, and a longitudinally movable plunger element having an enlarged end portion disposed within said elongated tubular body member and a handle extending from said opening in said opposite end thereof, said enlarged end portion having shoulders thereon adapted to secure said free ends of said ribbon member between said shoulders and said raised portions.

3. An article of manufacture comprising, in combination, a tubular body member having an opening in an end thereof, slots disposed in said tubular body member and at least one opening disposed between said end opening and one of said slots, a ribbon member disposed within said tubular body member and having free ends extending through said slots, and a longitudinally movable plunger element disposed within said tubular body member adapted to wedge said free ends of said ribbon member within said tubular body member.

4. An article of manufacture comprising, in combination, a tubular body member having an opening in an end thereof, slots disposed in said tubular body member and at least one opening disposed between said end opening and one of said slots, a raised portion disposed within said tubular body member between said slots and said at least one opening, a ribbon member disposed within said tubular body member and having free ends extending through said slots, and a plunger element longitudinally movable within said tubular body member and adapted to wedge said ribbon member between a portion thereof and said raised portion.

5. An article of manufacture comprising, in combination, a tubular body member having slots near an open end thereof, raised portions disposed within said tubular body member proximate said slots, a ribbon member disposed within said tubular body member and having free ends extending through said slots, and a plunger element longitudinally movable within said tubular body member and adapted to wedge said ribbon member between a portion thereof and said raised portions.

References Cited in the file of this patent

UNITED STATES PATENTS

| | | |
|---|---|---|
| 1,388,960 | Lerch | Aug. 30, 1921 |
| 2,090,354 | Massman | Aug. 17, 1937 |
| 2,461,781 | Sorrell | Feb. 15, 1949 |
| 2,945,491 | Gibbs | July 19, 1960 |
| 3,017,879 | Sapit et al. | Jan. 23, 1962 |

FOREIGN PATENTS

| | | |
|---|---|---|
| 13,059 | Great Britain | of 1900 |

OTHER REFERENCES

Hall article, "Studies on Oxyuriasis," American Journal of Tropical Medicine, May 1937, pages 445–450.